United States Patent

[11] 3,585,295

[72] Inventor Peter Haferl
Adliswil, Switzerland
[21] Appl. No. 790,762
[22] Filed Jan. 13, 1969
[45] Patented June 15, 1971
[73] Assignee RCA Corporation
[32] Priority Aug. 27, 1968
[33] Great Britain
[31] 40980/68

[54] VIDEO AMPLIFIER
8 Claims, 3 Drawing Figs.

[52] U.S. Cl. .......... 178/7.3 DC
[51] Int. Cl. .......... H04n 5/16
[50] Field of Search .......... 178/7.3 DC, 7.5 DC, 6, 7.5

[56] References Cited
UNITED STATES PATENTS
3,324,405 6/1967 Corney .......... 178/7.3 (DC)

*Primary Examiner*—Richard Murray
*Attorney*—Eugene M. Whitacre

ABSTRACT: The operating point of a wide band transistor amplifier is established by the charge on a capacitor which couples a source of video signals to the transistor input electrodes. A source of repetitive pulses associated with the video signals is coupled to the amplifier through the capacitor. The pulses are of an amplitude and polarity to cut off the amplifier and to serve as the predominant charging current source for the capacitor. A rectifier is coupled between the transistor input electrodes to serve as a charging path for the capacitor and to provide temperature stabilization of the amplifier during the period between the pulses.

INVENTOR
PETER HAFERL
BY Eugene M. Whitacre
ATTORNEY

INVENTOR
PETER HAFERL

BY Eugene M. Whitacre
ATTORNEY

VIDEO AMPLIFIER

This invention relates to video amplifiers and more particularly to biasing circuits for video amplifiers.

In a video amplifier for use in a television receiver there is normally a requirement that the DC component of the video signal be preserved. In television amplifier channels such as luminance or chrominance, AC coupling, although not conventional, might be utilized, provided the magnitudes of the coupling capacitors are large enough to accommodate the relatively wide bandwidth.

This presents problems in transistorized circuits because of the impedance levels associated therewith. Accordingly, using AC coupling in transistor amplifier circuits is not particularly feasible due to the magnitude of capacitance required for suitable operation.

In general the design of cascaded DC coupled amplifiers presents a problem in that the DC voltage required at an output of one amplifier is usually incompatible with that DC voltage required at an input of a succeeding stage. In order to circumvent this problem one approach uses a battery coupled between two video amplifying stages. This technique has apparent disadvantages in that it is expensive to implement and is extremely dependent upon the impedance and voltage rating of the battery.

Other approaches use coupling capacitors, as in the AC approach, with DC restoration. These techniques employ suitably poled diodes, constant bias potential sources, and coupling capacitors. A typical restoring circuit is responsive to, for example, the sync tips present in the video signal to charge the coupling capacitor to a suitable DC level.

Such approaches have problems in that the charge time constant should be small, because of the limited energy in the sync pulse, while the discharge time constant should be long to prevent a change in brightness across a television line.

Such DC restorers operate as peak detectors and hence are sensitive to noise pulses when present in a video signal.

In general AC coupling, and AC coupling with DC restoration provide inferior noise immunity. Therefore many conventional television receivers utilize video amplifiers which are DC coupled over two or more stages to avoid these problems. DC coupling presents problems in that the output DC of a first stage is usually incompatible with the DC input required at the succeeding stage.

Transistor DC coupled amplifiers and stages using the above AC techniques possess similar disadvantages; coupled with the fact that their input circuits draw current and hence serve to deplete charge from capacitors as used in typical DC restorers. Furthermore, transistor characteristics are susceptible to temperature change. Temperature compensation on a per stage basis is expensive as requiring additional components.

It is therefore an object of the present invention to provide an improved transistor video amplifier for use in a television receiver.

A further object is to provide an improved video amplifier employing cascaded transistorized stages for providing an effective coupling path with improved noise immunity for use in a television receiver.

According to an embodiment of the invention, a transistor amplifier employs a diode coupled between the base electrode of an input stage and a point of reference potential. The base electrode of the transistor is also coupled through a capacitor to a low impedance video source and a source of pulses which may be derived from a horizontal retrace pulse source present in a conventional receiver.

During the television retrace interval the pulse, forward biases the diode which simultaneously cuts off the input amplifying stage. Pulse current flowing through the diode charges up the coupling capacitor to provide a potential at the junction of the diode and the base electrode of the transistor, of a polarity to forward bias the transistor and reverse bias the diode. Accordingly, during the line interval the transistor is allowed to conduct. The value of the capacitor is made relatively small as the retrace pulse is selected to be of relatively high magnitude. A greater percentage of charge on the coupling capacitor is derived from the retrace pulse and a smaller, but appreciable amount of charge, due to the peak excursions of the video signal or sync tips. Accordingly, the circuits then tend to follow video fluctuations while maintaining a desired black level with good noise and pulse interference immunity.

Because of the polarity of the diode coupled to the input base electrode of the transistor amplifier, temperature compensation is afforded by the circuit and therefore voltage changes in the amplifier due to temperature are compensated for.

These and other objects of the present invention will become clearer as reference is made to the following specification and drawings in which.

Figures 1, 2:
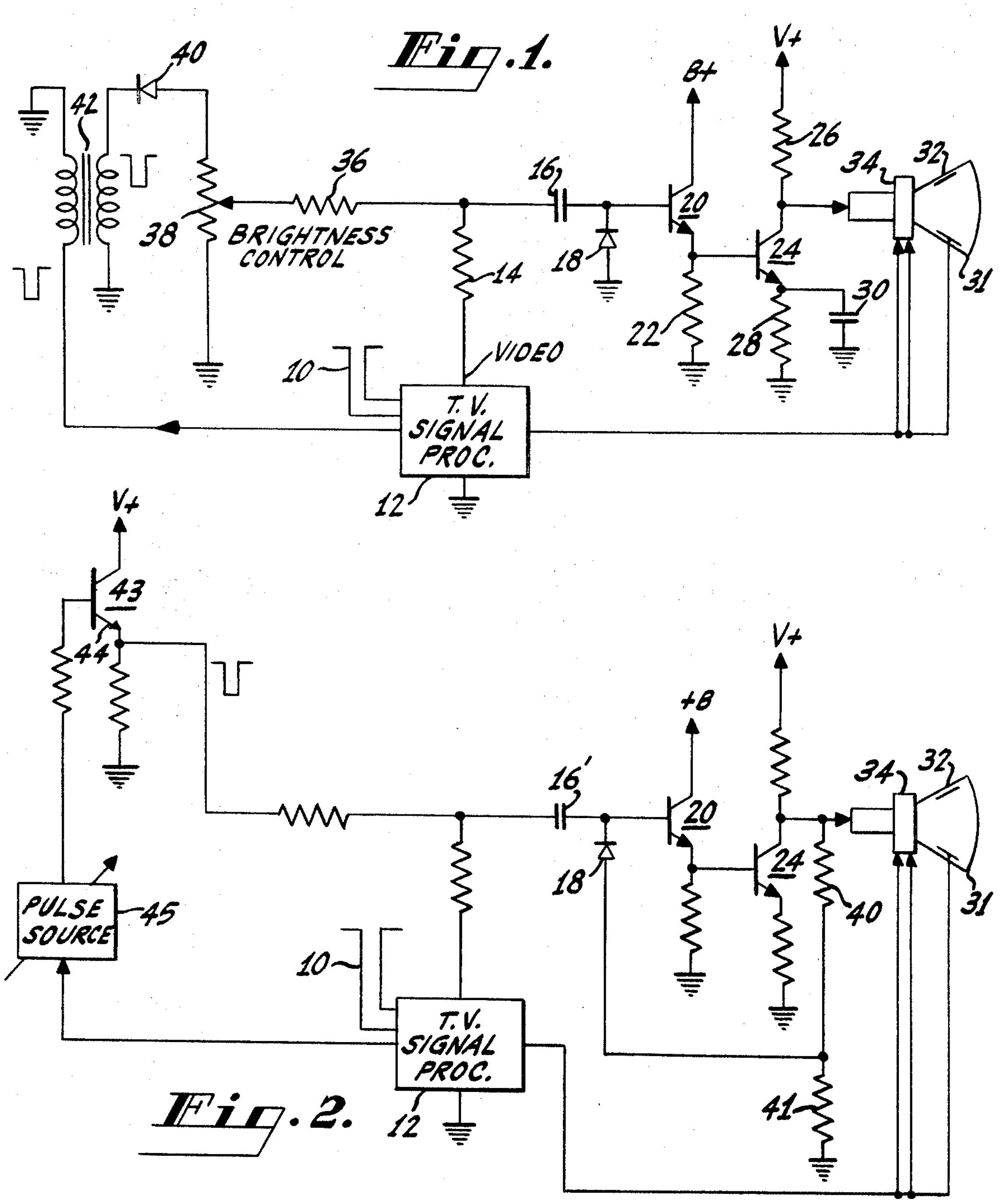
FIG. 1 is a schematic diagram partially in block form of a television receiver embodying a video amplifier according to this invention.
FIG. 2 is a schematic diagram partially in block form of a television receiver embodying an alternate version of a video amplifier according to this invention.

Referring to FIG. 1 the television antenna 10 receives radio frequency television signal transmissions and couples them to the television signal processor 12. Processor 12 conventionally performs the functions inherent in television processing circuitry. Therefore processor 12 develops suitable waveshapes synchronized to components contained within the composite television signal for deflecting the electron beams supported by the kinescope 32. Accordingly, there is shown output from 12 to the deflection yoke 34 associated with the kinescope 32. A portion of the circuitry included within processor 12 functions to process video information contained in the composite signal for providing at a suitable output a detected video signal. The detected video signal is shown coupled to a resistor 14 and through a coupling capacitor 16 to the base electrode of a transistor 20 arranged in a common collector configuration. Coupled between the junction of the base electrode of transistor 20 and capacitor 16 is the cathode electrode of a semiconductor diode 18 having the anode electrode coupled to a point of reference potential such as ground.

Conventionally the emitter electrode of transistor 20 is coupled to the point of reference potential through a resistor 22 while the collector electrode is returned to a source of potential designated as B+.

A second transistor 24 arranged in a common emitter configuration has its base electrode drive supplied by the coupling path between the emitter electrode of transistor 20 and the base electrode of transistor 24. A self biasing network comprising a resistor 28 and a shunt capacitor 30 is coupled between the emitter electrode of transistor 24 and the point of reference potential. A load resistor 26 couples the collector electrode of transistor 24 to a source of operating potential designated as V+. The collector electrode is utilized as an output for driving or applying to a suitable electrode of the kinescope 32, the amplified video signal. The junction between capacitor 16 and resistor 14 is also coupled through a resistor 36 to the variable arm of a potentiometer 38 labeled brightness control. Potentiometer 38 has one terminal thereof coupled to a point of reference potential and a second terminal coupled to the anode electrode of a diode 40. The cathode electrode of diode 40 is coupled through the secondary winding of transformer 42 to the point of reference potential. The primary winding of transformer 42 is coupled between the point of reference potential and a pulse source output derived from the television signal processor 12.

The television signal processor 12, as indicated above, furnishes suitable deflection waveshapes for application to the kinescope 32. Such waveshapes are commonly referred to as horizontal and vertical sweep signals. The horizontal signal in a typical receiver is generated by means of a suitable sawtooth waveform generator which operates under the influence of horizontal synchronizing pulses contained in the composite signal and retrieved by a sync separator circuit included in processor 12. Such sawtooth waveshapes have a transition referred to as retrace or flyback and occurring at the end of the horizontal scan. During this interval a retrace pulse is generated by such circuitry and it is this pulse of a negative polarity which is applied to the primary winding of transformer 42. As will be seen subsequently other suitable pulse sources conventionally developed by television signal processing circuitry might be utilized as well.

The operation of the video amplifier described above is as follows. The negative horizontal retrace pulses cause diode 40 to conduct. The diode 40 serves to clip or eliminate any ripple which might otherwise appear across potentiometer 38, from appearing during the line or scan interval of the display. The negative pulse is applied through resistor 36 and coupling capacitor 16 to the base electrode of the emitter follower transistor 20. During the horizontal retrace interval the negative pulse serves to forward bias diode 18 and serves to cutoff transistor 20. The pulse current flowing through diode 18 and capacitor 16 into the retrace pulse source via diode 40 and the secondary winding of transformer 42, charges up capacitor 16 to provide a positive potential at the junction between capacitor 16 and the cathode electrode of diode 18. At the termination of the retrace interval, the pulse source represents ground potential, so that the positive charge on capacitor 16, reverse biases diode 18 and forward biases transistor 20. Transistor 20 as indicated above is DC coupled to the power output stage 24 which serves to apply the amplified video signal to a suitable electrode of kinescope 32.

In operation of the above circuit, the clamping action, the video black level maintenance, and the noise and interference pulse immunity are dependent upon the charge furnished across capacitor 16.

Due to the selection of the magnitude of the retrace pulse and the impedance associated therewith the charge across capacitor 16 is primarily dependent upon the current furnished by the negative retrace pulse and not that dependent upon the video signal. In a practical example the retrace pulse energy contributed is approximately 10 times that due to the video energy as represented by the magnitude of the sync pulse. The value of capacitor 16 can be selected relatively small because the available charging current is large. Conversely, the value of the input impedance at the base electrode of transistor 20 can be reduced quite substantially before the discharge time constant becomes too small. Accordingly arranging transistor 20 in a common collector configuration is not a necessary requirement for proper circuit operation.

As indicated above the timing of the clamping action occurs during the blanking interval but the clamping level is dependent mainly upon the amplitude of the clamping pulse or horizontal retrace pulse. In conventional clamping circuits the clamping level is set by the signal where, for example, the sync tips or the back porch pedestal are used as a reference.

In the above-described circuit, noise pulses occurring during the line period can not have sufficient amplitude to reverse bias the diode 18 and charge capacitor 16 because of the limited voltage swing of the preceeding stages. As the noise pulse coincides with sync tip, the disturbance is still small because the heavy diode 18 conduction results in an integration of the total energy and the noise pulse energy is relatively small. As indicated above, during the horizontal retrace interval when the pulse is present at the base electrode of the transistor 20 the pulse polarity serves to reverse bias or cutoff transistor 20, which in turn, because of the DC coupling path, cuts off current flowing in transistor 24. The collector electrode potential of transistor 24 goes towards V+ which transition is applied to the cathode electrode of the kinescope 32 causing current conduction or beam current therein to cease.

Consequently this action eliminates the need for specific circuits for horizontal blanking due to the relative accuracy of black level maintenance in the circuits. Special provision for vertical blanking would not appear necessary in actual operation. Any drift in preceding amplifying stages which can be AC or capactively coupled will not disturb the value of the black level as evidenced by the charge on capacitor 16 because of the large energy content of the flyback or retrace pulse. The brightness control potentiometer 38 adjusts the amplitude of the retrace pulses which in turn results in a change in the charge developed across capacitor 16. This charge or voltage across capacitor 16 establishes the desired quiescent operating point of transistor 20 and therefore of transistor 24. An increase in the pulse amplitude will increase the brightness level and vice versa.

As can be seen the circuit also provides a means of brightness limiting. During the condition where the kinescope begins to draw excessive beam current the horizontal circuitry of a typical receiver becomes overloaded as the horizontal circuitry is a conventional source for developing operating potentials for the kinescope 32. In this manner the magnitude of the retrace pulse decreases because of this overload. Therefore during this condition the charge across capacitor 16 decreases which action tends to bias the kinescope 32 in the reverse direction. This action tends to reduce the magnitude of the beam current and therefore serves to restrict the amount of beam current conduction for the kinescope 32.

The operating quiescent points of transistors 20 and 24 are temperature stabilized by diode 18 in the following manner. With increased temperature of the environment the collector currents of transistors 20 and 24 will increase which effect by itself will result in an increase in brightness of the kinescope 32. However, due to the increasing temperature of the environment the reverse current flowing through diode 18 will also increase. This results in a lower effective reverse resistance of diode 18. This lower effective resistance at high temperature reduces the voltage stored across capacitor 16 and therefore reduces the effective positive bias applied to transistor 20 during the line scan. This type of temperature stabilization produces a magnitude of collector voltage change in transistor 24 of less than 5 percent with a temperature increase from 25° C. to 60° C.

In summation some of the advantages of the circuit described in FIG. 1 are as follows. The circuit permits capacitive coupling in the video stages of a television receiver, while providing DC restoration for the entire AC coupled chain. Current practice usually resorts to DC coupling between two or three video stages because of the inferior noise immunity of conventional DC restorers, and of AC coupling in general. The circuit provides noise and interference pulse immunity because of the magnitude of the energy supplied to the coupling capacitor 16 from the retrace pulse source. No additional blanking circuits are necessary. Temperature compensation is inherently provided by the circuit while the frequency response of the output amplifier is maintained optimum because there are no controls as brightness and so on, coupled directly to the video circuitry which would tend to increase the capacitive loading. A 20 percent or better reduction of collector power dissipation is afforded by use of the described video circuit because of the fact that transistors 20 and 24 are cutoff during the blanking interval.

In general television receivers using this circuit can employ simpler automatic gain control (AGC) circuits, for example, average type AGC because the DC is continuously restored by the circuit and the black level is controlled mainly by the setting of potentiometer 38. Furthermore, due to the location of the clamp diode 18 in the base electrode circuit of transistor 20, a low voltage general purpose diode can be employed, as compared to the type utilized, for example, to provide DC restoration directly at a suitable kinescope electrode.

Referring to FIG. 2, there is shown a similar amplifier configuration as that of FIG. 1 with the addition of a DC feedback path from the collector electrode of transistor 24 to the base electrode of transistor 20.

Diode 18, instead of having its anode electrode returned to a point of reference potential, as ground, (FIG. 1) has its anode electrode coupled to the junction of resistors 40 and 41 for DC negative feedback operation. The subsequent feedback further improves temperature stability while offering the overall advantages of negative feedback as keeping the gain characteristics of transistors 20 and 24 relatively constant and so on.

Capacitor 16 coupled to the base electrode of transistor 20 is charged during a repetitive interval by the negative pulse shown applied thereto by the low output impedance common collector stage 43 comprising transistor 44.

The base electrode of transistor 44 is coupled to a variable pulse source 45. It is noted that the source of pulses may occur during the horizontal or vertical period. The intention again being that such pulses be of sufficient energy to charge capacitor 16 to the required level for biasing transistor 20. The low impedance, large current characteristics of the pulse source being necessary for a fast charge rate with high energy content.

Figure 3:
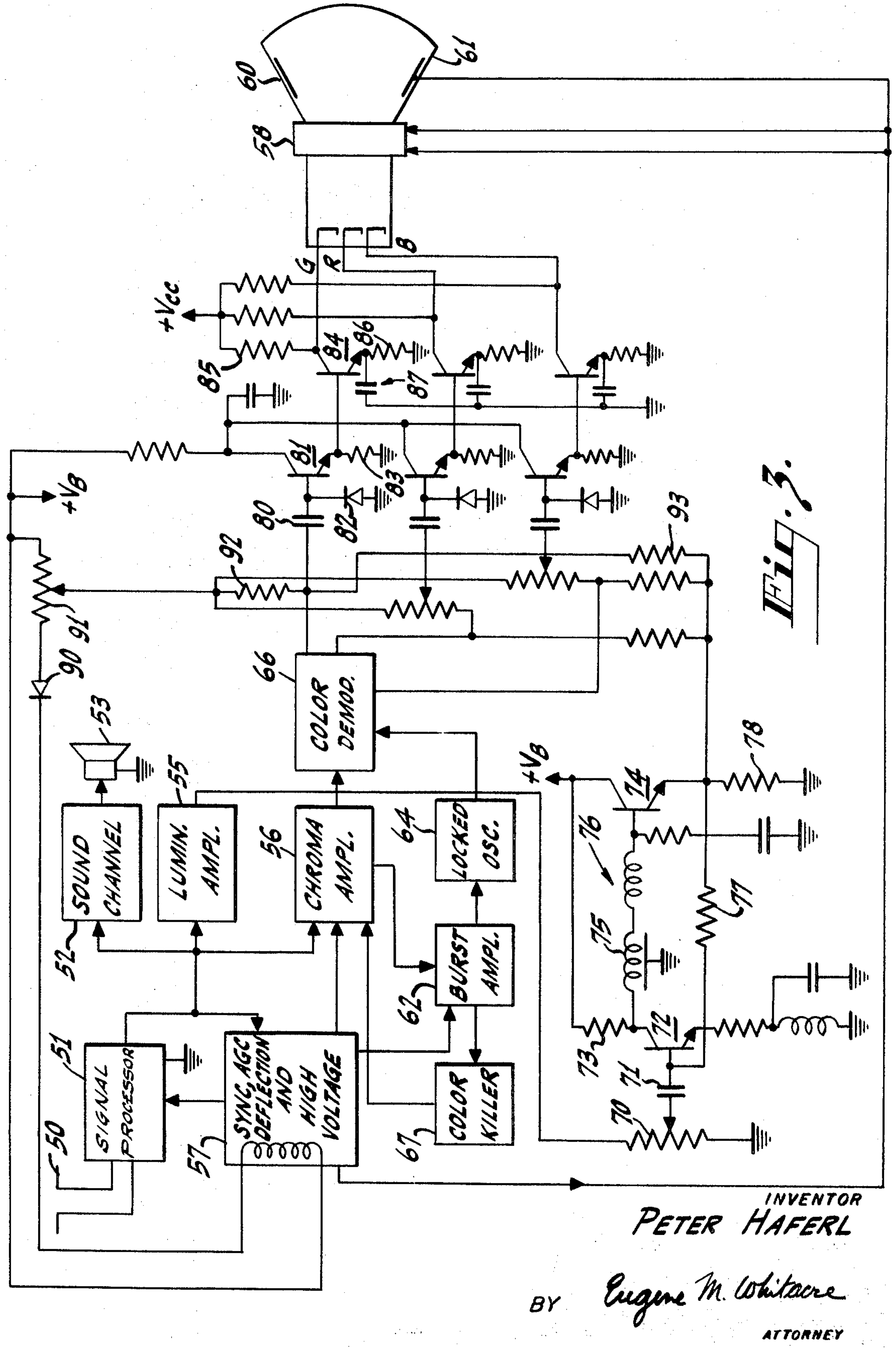
FIG. 3 is a schematic diagram partially in block form of a color television receiver embodying amplifiers according to this invention.

Referring to FIG. 3 there is shown a color television receiver employing three amplifiers according to this invention.

A television signal processor 51 is coupled to an antenna 50, which receives transmitted radio frequency (R.F.) television signals. The signal processor 51 contains suitable amplifiers and circuitry for converting the R.F. signals to video and audio intermediate frequency (I.F.) components. The audio I.F. is coupled to a sound channel 52 for demodulation of sound information and application of the recovered audio signal to a speaker 53.

The video I.F. is detected within signal processor 51 and applied to a luminance amplifier channel 55 and a chrominance amplifier 56. The detected video is also applied to the sync, A.G.C. and high voltage circuitry 57, where the sync components are retrieved or "stripped" from the video signal and applied to suitable deflection generators, horizontal and vertical, for application to a deflection yoke 58 associated with the kinescope 60. High voltage supplies for biasing and operating the kinescope 60 are conventionally developed by suitable circuitry operating on horizontal retrace pulses developed in circuitry 57. Accordingly, there is shown a lead for applying ultor potential to the second anode 61 of the kinescope 60.

An output from the chroma amplifier 56 is coupled to the input of a burst amplifier 62 having another input thereof coupled to the output of the sync, AGC and deflection circuits 57. The burst amplifier 62 is keyed by a suitable pulse developed in the deflection circuits 57 for separating out a color burst signal from the chrominance signal during a color transmission. An output of the burst amplifier 62 is used to lock a color subcarrier oscillator 64. The output of oscillator 64 is coupled to an input of color demodulators 66 having another input coupled to an output of the chrominance amplifier 56. The function of the color demodulators 66 is to demodulate the chrominance signal under control of the reference subcarrier oscillator signal to provide at suitable outputs thereof the color difference signals as R—Y, B—Y and G—Y. Also shown coupled to the burst amplifier 62 is an input of a color killer circuit 67 having an output coupled to a suitable input of the chroma amplifier 56. The function of the color killer circuit 67 is to detect the absence of the burst signal to provide a disable signal for turning off or blanking the chroma amplifier 56 during a monochrome transmission.

In conventional receivers the color difference signals as obtained from the output of the color demodulator 66 may be applied directly to suitable electrodes of the kinescope 60, while the luminance signal as obtained at the output of luminance amplifier 55 may be applied to other electrodes of the kinescope 60. The kinescope 60 performs matrixing internally. In this receiver the output of the luminance amplifier 55 is applied to one terminal of a potentiometer 70 having the other terminal connected to a point of reference potential. The variable arm of potentiometer 70 is coupled to the base electrode of a transistor 72 through a capacitor 71. Transistor 72 is arranged in a common emitter configuration and has a load resistor 73 connected between the collector electrode and a source of potential $+V_B$. The emitter electrode of transistor 72 is coupled through suitable peaking circuitry, necessary for assuring a suitable high frequency response of transistor amplifier 72 to accommodate the relatively wide band luminance signals. A second transistor 74 has its base electrode coupled to the collector electrode of transistor 72 via a luminance delay line 75 in series with a peaking inductor 76. Transistor 74 is arranged in a common emitter configuration. The collector electrode is returned to ground through a self biasing resistor 78 and is coupled to the base electrode of transistor 72 via a feedback resistor 77 used for gain and impedance stability. Accordingly, the emitter electrode of transistor 74 furnishes the delayed luminance signal or Y signal as conventionally generated in most color television receivers. It is again noted that capacitor 71 coupling potentiometer 70 to the base electrode of transistor 72 AC couples the luminance amplifier 55, which may actually be a suitable output from the video detector, to the additional luminance stages comprising in part transistor 72 and 74. The outputs of the color demodulators 66 as the B—Y, R—Y and G—Y color difference signals are respectively AC coupled to a separate input electrode of a video transistor amplifier stage according to FIG. 1. In this manner the G—Y output for example, is coupled through a capacitor 80 to the base electrode of a transistor 81 arranged in a common collector configuration. A semiconductor diode 82 is coupled between the base electrode of transistor 81 and ground. Transistor 81 has the emitter electrode coupled to ground through a resistor 83. The emitter electrode of transistor 81 is directly coupled to the base electrode of transistor 84 arranged in a common emitter configuration. Transistor 84 has a collector load resistor 85 having one terminal coupled to a source of potential $+V_{cc}$. The emitter electrode of transistor 84 is returned to ground through a self biasing resistor 86 which is bypassed at high frequencies by a capacitor 87. The cathode electrode of the kinescope 60 is directly coupled to the collector electrode of transistor 84 which supplies drive thereto. In a similar manner there is shown two other amplifying stages identical to that described above for applying the two other color difference signals R—Y and B—Y to the two other cathode electrodes of the kinescope 60. The operation of the circuits will be described with reference to the above-mentioned circuit, comprising in part, transistors 81 and 84. A retrace pulse source providing negative pulses of high energy content during the horizontal retrace interval is coupled to the junction between an output of the color demodulators 66 and capacitor 80 through a semiconductor rectifying diode 90 having its anode electrode coupled to the $+V_B$ supply through a potentiometer 91. The variable arm of potentiometer 91 is coupled to the aforementioned junction through a current limiting resistor 92. The same junction is also coupled to the emitter electrode of transistor 74 through a resistor 93 to provide thereat the luminance or Y component associated with the video signal. In this manner, both the color difference signal and the Y signal are matrixed at said junction due to the coupling thereto of the color demodulator 66 and the luminance amplifier comprising in part transistor 74. As described in FIG. 1, the horizontal retrace pulse as coupled via diode 90 serves to charge capacitor 80 in a direction to provide a positive potential at the base electrode of transistor 81. During this charging time or for the presence of the horizontal retrace pulse, transistor 81 is biased in cutoff and diode 82 is reversed biased hence providing blanking of the kinescope by causing transistor 84 to cutoff. The positive potential due to the high energy blanking pulse permits transistor 81 and therefore transistor 84 to be biased on during the line scan thus providing the amplified color signal at the respective electrode of the kinescope 60. The circuit as described provides the full advantages and operates according to the same principles disclosed in FIG. 1 and is particularly useful for the R, B and G type color receiver of FIG. 3. The common brightness control 91 as adjusting the magnitude of the horizontal retrace pulse for charging the coupling capacitors as 80, operates with a minimum crosstalk between color channels because of the resistive isolation afforded by the limiting resistor 92. Similarly, the operation of the brightness control 91 does not appreciably load the video circuit and hence does not disturb the video frequency response. The contrast control or potentiometer 70 can be conveniently located as shown in the luminance amplifier circuitry preceeding the chrominance takeoff point for providing a combined contrast and chroma control.

A circuit operating in a television receiver as indicated in FIG. 3 utilized the following components.

| | |
|---|---|
| Transistor **72** | TA2605 |
| Transistor **74** | TA2529 |
| Transistor **81** | TA2605 |
| Transistor **84** | TA2529 |
| Resistor **70** | 100 ohms variable |
| Resistor **73** | 1800 ohms |
| Resistor **77** | 470 K. ohms |
| Resistor **78** | 1,000 ohms |
| Resistor **83** | 1,000 ohms |
| Resistor **85** | 5,600 ohms |
| Resistor **86** | 100 ohms |
| Resistor **91** | 100 ohms variable |
| Resistor **92** | 1,000 ohms |
| Capacitor **71** | 10 microfarads |
| Capacitor **80** | 1.6 microfarads |
| Capacitor **87** | 680 micromicrofarads |
| Diode **82** | OA85 |
| Diode **90** | OA85 |
| $+V_B$ 30 volts p1 $+V_{cc}$ | 140 volts |

The other video amplifier circuits including representative components as shown in FIG. 3 and not referenced to by any particular numerals, utilized the same values for corresponding circuit components with transistor stages identical to that comprising in part transistors 81 and 84.

I claim:

1. A video signal amplifier comprising the combination of:

a. a source of video signals having a repetitive synchronizing interval included therein, b. an amplifying device having an input, output and common electrodes, c. a capacitor coupling said source of video signals between said input and common electrodes, d. a unidirectional current conduction device coupled between said input and common electrodes of said amplifying device, said unidirectional conduction device connected to be poled opposite to the direction for easy current flow between the input and common electrodes, e. means coupled to said source and responsive to said video signals for providing a repetitive pulse of a predetermined magnitude and polarity during said synchronizing interval, f. means including said capacitor for additionally coupling said repetitive pulse between said input and common electrodes and across said unidirectional current device, said pulse being of a polarity to disable said amplifying device and to forward bias said unidirectional current device, and of a magnitude to provide the predominant charging of said capacitor through said unidirectional device during said pulse interval as compared to the charging provided by said video signals during said synchronizing interval, said capacitor having a charge stored thereacross at the termination of said pulse to thereafter reverse bias said unidirectional current device and enable said amplifying device to conduct and amplify video signals following said synchronizing interval about an operating point determined by said capacitor charge.

2. A video signal amplifier for use in a television receiver including a source of video signals containing repetitive synchronizing intervals including synchronizing pulses, video information components dispersed between said intervals and occupying a give frequency range, said video signals including DC information of an amplitude partially dependent upon the magnitude of said synchronizing pulses, comprising:

a. an amplifier having an input and output electrode, b. first means including at least one capacitor, coupling said input electrode to said signal source, c. second means coupled to said signal source and responsive to said video signals for providing repetitive signals occurring during said synchronizing intervals, d. a unidirectional current device coupled between said input electrode of said amplifier and a point of reference potential, e. coupling means between said first means and said second means for charging said capacitor through said diode with said repetitive signals to a level according to the amplitude of said repetitive signals, and in a direction to forward bias said unidirectional device and disable said amplifier during said synchronizing interval, said capacitor being charged by said repetitive signals to a voltage of a polarity to thereafter reverse bias said unidirectional device and enable said amplifier to respond to said video signal information components about an operating point determined primarily by said voltage developed across said capacitor by the charging through said diode and secondarily by the amplitude of said synchronizing pulses coupled by said first means to the input electrode of said amplifier.

3. An amplifier for use with a source of video signals having a DC information component, comprising:

a. a first transistor amplifier stage, arranged in a common collector configuration, and having a base input electrode, b. a second transistor amplifier stage arranged in a common emitter configuration and having the base electrode directly coupled to the emitter output electrode of said first amplifier stage, c. a unidirectional current conduction device coupled between said base input electrode of said first transistor amplifier and a point of reference potential, d. a source of repetitive signals having an energy content greater than the energy present in said video DC information signal source, e. a capacitor coupled to the base input electrode of said first amplifier stage, and f. means for coupling said source of video signals and said source of repetitive signals to said capacitor for application to said base input electrode of said first amplifier stage to forward bias said unidirectional current device and charge said capacitor to operate said first amplifier stage at a quiescent level determined primarily by the energy contained in said repetitive signals as compared to the energy contained in said video signals, said energy content of said repetitive signals being of a polarity and of sufficient magnitude to first disable said first amplifier stage during the charging of said capacitor when said unidirectional current device is forward biased and to then enable said first amplifier stage upon completion of the charging of said capacitor when said repetitive signals are terminated to reverse bias said unidirectional current device.

4. A video amplifier circuit for use in a television receiver employing a kinescope used for a display presentation and having suitable control electrodes for the application thereto of a video signal from a video source containing repetitive synchronizing intervals including synchronizing pulses, video information components dispersed between said intervals, said video signals including DC information of an amplitude dependent upon the magnitude of said synchronizing pulses, comprising:

a. a first amplifier, having an input and an output electrode, b. a second amplifier having an input and output electrode, said input electrode direct coupled to said output electrode of said first amplifier, and said output electrode of said second amplifier being direct coupled to at least one of said control electrodes of said kinescope, c. first means coupled to said video source and responsive to said repetitive synchronizing pulses in said video signal for providing at an output terminal thereof a source of repetitive signals of a predetermined polarity and a given amplitude, d. a unidirectional current conducting device coupled between said input electrode of said first amplifier and a point of reference potential, e. a capacitor coupled to the input electrode of said first amplifier, and f. second means coupling said video source and said source of repetitive signals to said capacitor for application to said input electrode of said first amplifier for charging said capacitor through said unidirectional current conducting device to a quiescent level for establishing an operating bias for said first and therefore said second amplifying stages, said repetitive signals being of said predetermined polarity and amplitude for forward biasing said unidirectional current conducting device during said charging of said capacitor to disable said amplifiers and therefore said kinescope, and for reverse biasing said unidirectional device after completion of said capacitor charging to provide said operating bias to enable said amplifiers and therefore said kinescope at a level primarily determined by the amplitude of said repetitive signals relatively irrespective of the amplitude of said video signals.

5. The video amplifier circuit according to claim 4 wherein said first amplifier comprises, a. a transistor amplifier arranged in a common collector configuration having an input electrode with a relatively high impedance with respect to a point of reference potential and an output electrode having a substantially lower impedance when compared with that impedance of said input electrode.

6. The video amplifier circuit according to claim 5 wherein said second amplifier comprises, a. a transistor amplifier arranged in a common emitter configuration and having a base electrode directly connected to said output electrode of said common collector stage.

7. The video amplifier according to claim 6 wherein said unidirectional current conduction device comprises, a. a semiconductor diode having a cathode electrode coupled to said input electrode of said first transistor amplifier and an anode electrode coupled to a point of reference potential whereby said charge on said capacitive coupling due to said repetitive signal as establishing said quiescent level is a function of the reverse impedance of said semiconductor diode.

8. The video amplifier according to claim 4 wherein said second means coupling said first means to said input electrodes of said first amplifier further includes, a. a variable impedance network for adjusting the amplitude of said repetitive signals as applied to said input electrode for varying said charge stored on said capacitor within predescribed limits, whereby the quiescent operating points of said amplifiers and therefore said kinescope are varied accordingly.

UNITED STATES PATENT OFFICE
CERTIFICATE OF CORRECTION

Patent No. 3,585,295 Dated June 15, 1971

Inventor(x) Peter Haferl

It is certified that error appears in the above-identified patent and that said Letters Patent are hereby corrected as shown below:

Column 2, Line 35, after "from" insert -- processor --.
Column 5, Line 64, delete "blanking" and insert -- blocking --.

Column 7, Line 34, delete "pl".
Column 8, Line 2, delete "give" and insert -- given --.

Signed and sealed this 11th day of January 1972.

(SEAL)
Attest:

EDWARD M.FLETCHER,JR.
Attesting Officer

ROBERT GOTTSCHALK
Acting Commissioner of Patents